UNITED STATES PATENT OFFICE 2,553,132

WELD ROD COATINGS

Arthur T. Cape and Charles V. Foerster, Canton, Ohio, assignors to Coast Metals, Inc., Canton, Ohio, a corporation of Delaware No Drawing. Application August 14, 1948,
Serial No. 44,397

9 Claims. (Cl. 219—8)

This invention relates, as indicated, to weld rod coatings, but has reference more particularly to coatings which are especially useful for incorporating carbon in hard facing welds consisting essentially of iron and/or alloys of the iron group metals.

It has heretofore been proposed to coat weld rods of iron or iron base alloys with a coating comprising powdered graphite and a binder, such, for example, as sodium silicate. In laying down a deposit by melting the coated weld rod, it has been found that in some instances, the welds will contain more carbon than in others, but it has not been possible by the use of such rods to incorporate in the weld deposit more than 2½% to 3% of carbon, even in cases where the weight of the coating constituted as much as 15% of the weight of the coated rod. For hard facing purposes, the weld deposit should contain at least 3.5% carbon.

In order to incorporate larger amounts of carbon in the weld deposit, it has also been common practice to use cast high carbon alloy rods, but the use of such rods has been limited, due to the cost of such rods and to the limitations on production imposed by reason of the fact that rods of suitable compositions cannot be rolled or forged but have to be cast.

We have discovered that the percentage of carbon in a weld deposit can be increased to as much as 5% and more, using ordinary iron or steel or low carbon alloy steel wire or rod and coating such wire or rod with a coating material having incorporated therein graphite of certain selected particle sizes. By the use of such ordinary iron or steel or low carbon alloy steel wire or rod as a source of the weld metal, we are able to effect considerable economy in the making of welds or hard facings, and to increase greatly the speed of welding rod production.

The particle sizes of graphite which possess this property of imparting increased amounts of carbon to the weld deposits are determined by a standard screen analysis of crushed or powdered graphite, that is to say, by separation of the graphite into portions which consist of particles of definite sizes, by means of a series of screens of graded sizes.

We have determined that the percentage of carbon in a weld deposit can be increased in a desired amount, in accordance with the invention, by utilizing, in the weld rod coating, graphite in which particles which remain on a standard 325 mesh screen or sieve constitute more than 60% by weight of the total amount of graphite used in the coating.

In one series of tests, using standard screens of 200 and 325 mesh, the relative proportions of the particles of various grades of graphite were as follows:

|   | +200 | −200+325 | −325 | Per Cent |
|---|------|----------|------|----------|
| A | 8.7  | 14.9     | 76.4 | 3.19     |
| B | 14.4 | 17.3     | 68.3 | 3.22     |
| C | 24.0 | 23.0     | 53.0 | 3.05     |
| D | 52.9 | 11.8     | 35.3 | 3.53     |
| E | 55.1 | 13.5     | 31.4 | 4.21     |
| F | 64.0 | 13.      | 23.0 | 5.38     |

The aforesaid varieties of graphite were incorporated in a weld rod coating in the following manner:

A mixture was made consisting of 2 lbs. and 6 ounces of the graphite, and 1 lb. and 5 ounces of sodium silicate, the variety of sodium silicate used containing 1 part $Na_2O$ and 3.22 parts of $SiO_2$. Alloy steel wires of about ⅛″ diameter, containing less than .1% carbon, were dipped in the mixture, and coated therewith, the coating thus formed on the rod representing, in each case, about 10%, by weight, of the coated rod or wire. The coating was then dried, and it adhered strongly to the surface of the rod.

The primary function of the coating is to stabilize the arc action of the welding rod, but in this instance, it also served as a means of introducing carbon into the welds or weld deposits. By incorporating graphite of predetermined particle sizes in the coating, the carbon content of the weld or weld deposit has been increased in some cases to about 5% or more.

Referring to the last column of the above table, this column denotes the percentage of carbon in the weld or weld deposit, resulting from the melting of the weld rod bearing the graphite coating in question.

It will be noted that in the case of the first three graphites, in which the percentage of particles passing through the 325 mesh screen was in excess of about 40%, the carbon content of the weld was considerably lower than in the case of those graphites in which the percentage of particles passing through the 325 mesh screen was below 40%, and that a desired carbon of more than 3.5% in the weld metal was not obtained until the percentage of particles passing through the 325 mesh screen was less than about 40%. This figure of 40% was established by these and other tests as a fairly critical one, but on the other hand, it was found desirable to avoid the use of too coarse particles of graphite in the coating, since these had a tendency to militate against the smooth appearance of the weld rod coating. Consequently, it was found desirable to avoid, as far as possible, the use of graphite particles of a size larger than will pass through a standard 60 mesh screen.

It will be understood that various changes can be made in the coating, as well as in the proportions of graphite, binder, etc., without departing from the scope of the appended claims.

Having thus described our invention, we claim:

1. A weld rod comprising an alloy containing a metal of the iron group, and having a coating thereon containing graphite, of which particles which pass through a standard 325 mesh screen constitute less than about 40% of the total graphite in the coating.

2. A weld rod, as defined in claim 1, in which said coating is about 10% of the weight of the coated rod.

3. A weld rod, as defined in claim 1, in which the graphite constituent of the coating is substantially devoid of particles which cannot pass through a standard 60 mesh screen.

4. A weld rod coating containing graphite, of which particles which pass through a standard 325 mesh screen constitute less than about 40% of the total graphite in the coating.

5. A weld rod coating, as defined in claim 4, in which the graphite constituent of the coating is substantially devoid of particles which cannot pass through a standard 60 mesh screen.

6. A weld rod coating consisting essentially of graphite and sodium silicate, the graphite consisting of particles of which less than about 40% will pass through a standard 325 mesh screen and in which the graphite constituent is substantially devoid of particles which cannot pass through a standard 60 mesh screen.

7. A weld rod comprising an alloy steel core containing less than .1% carbon, and having a coating thereon containing graphite, of which particles which pass through a standard 325 mesh screen constitute less than about 40% of the total graphite in the coating.

8. A weld rod, as defined in claim 7 in which said coating is about 10% of the weight of the coated rod.

9. A weld rod, as defined in claim 7, in which the graphite constituent of the coating is substantially devoid of particles which cannot pass through a standard 60 mesh screen.

ARTHUR T. CAPE.
CHARLES V. FOERSTER.

REFERENCES CITED

The following references are of record in the file of this patent:

UNITED STATES PATENTS

| Number | Name | Date |
| --- | --- | --- |
| 1,403,230 | Churchward | Jan. 10, 1922 |
| 1,942,364 | Rood | Jan. 2, 1934 |
| 1,974,732 | Andren | Sept. 25, 1934 |
| 2,016,585 | Basore | Oct. 8, 1935 |
| 2,037,596 | Schaub | Apr. 14, 1936 |
| 2,043,927 | Kronbach | June 9, 1936 |